Aug. 11, 1970     D. H. SCHUSTER     3,523,374
DRIVER TRAINING AND TESTING EQUIPMENT
Filed July 21, 1967     9 Sheets-Sheet 1
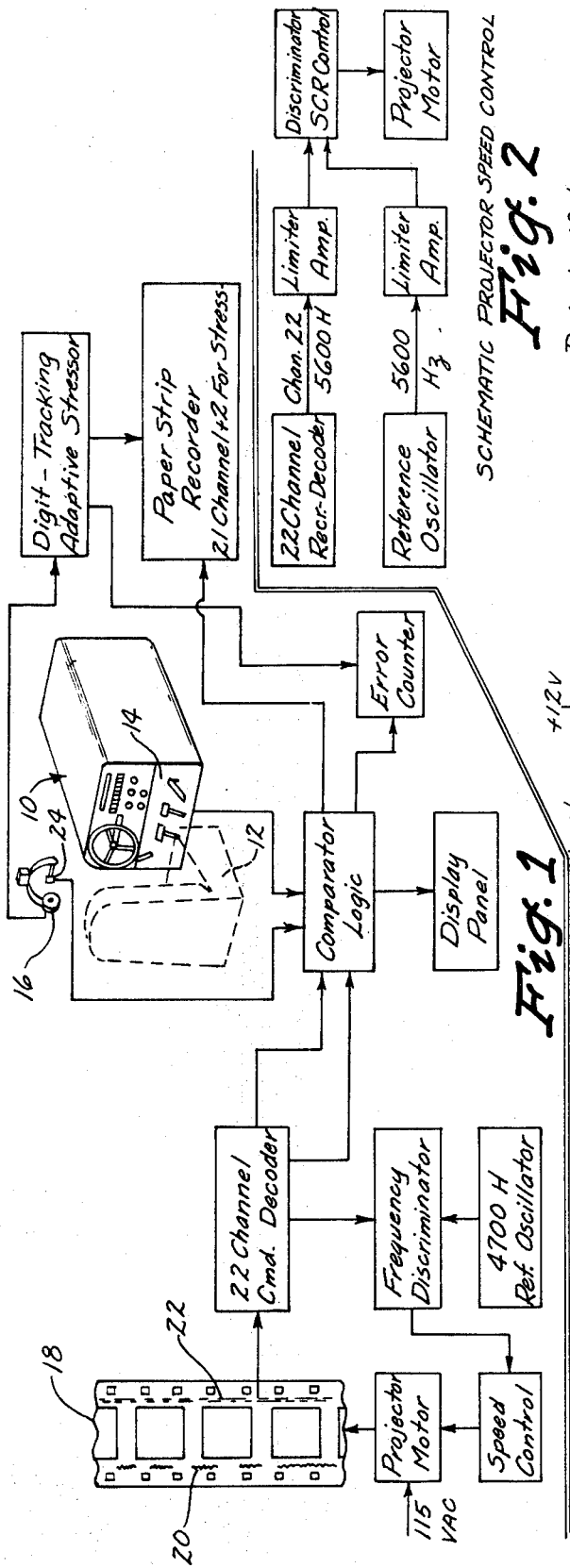
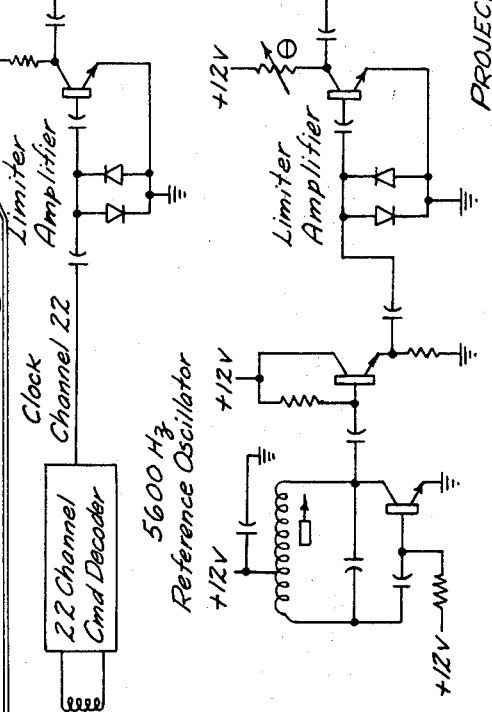
INVENTOR
DONALD H. SCHUSTER
BY
Dick, Zarley, McKee & Thomte
ATTORNEYS

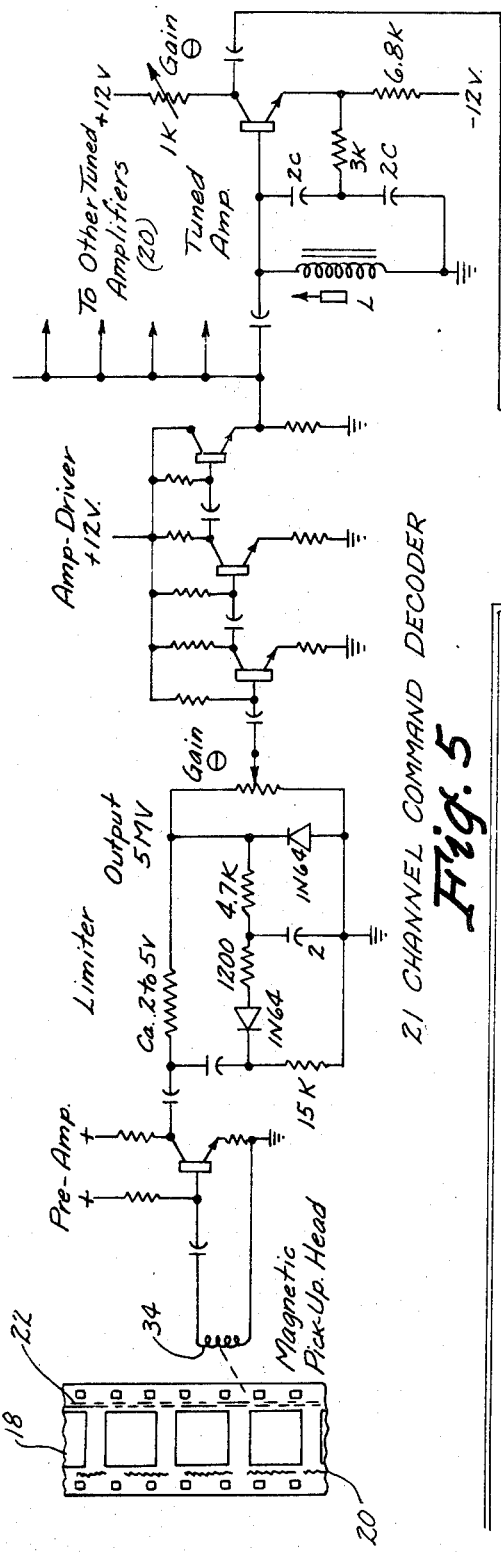
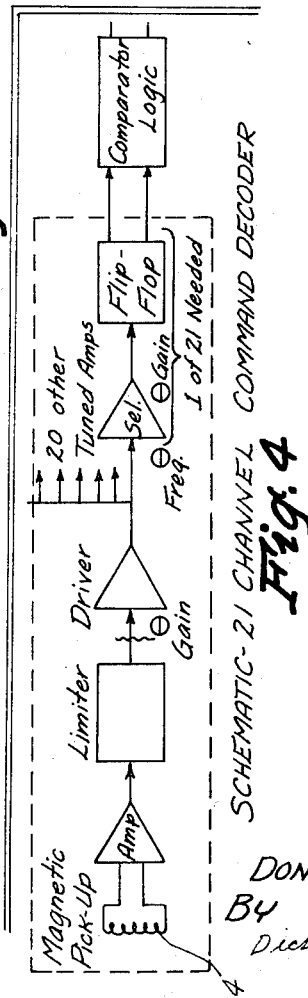
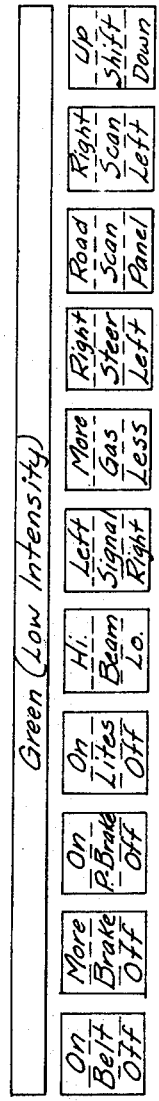
Fig. 5 2.1 CHANNEL COMMAND DECODER
Fig. 4 SCHEMATIC — 2.1 CHANNEL COMMAND DECODER
Fig. 6 INSTRUMENT PANEL
INVENTOR
DONALD H. SCHUSTER
BY
Dick, Zarley, McKee & Thomte
ATTORNEYS

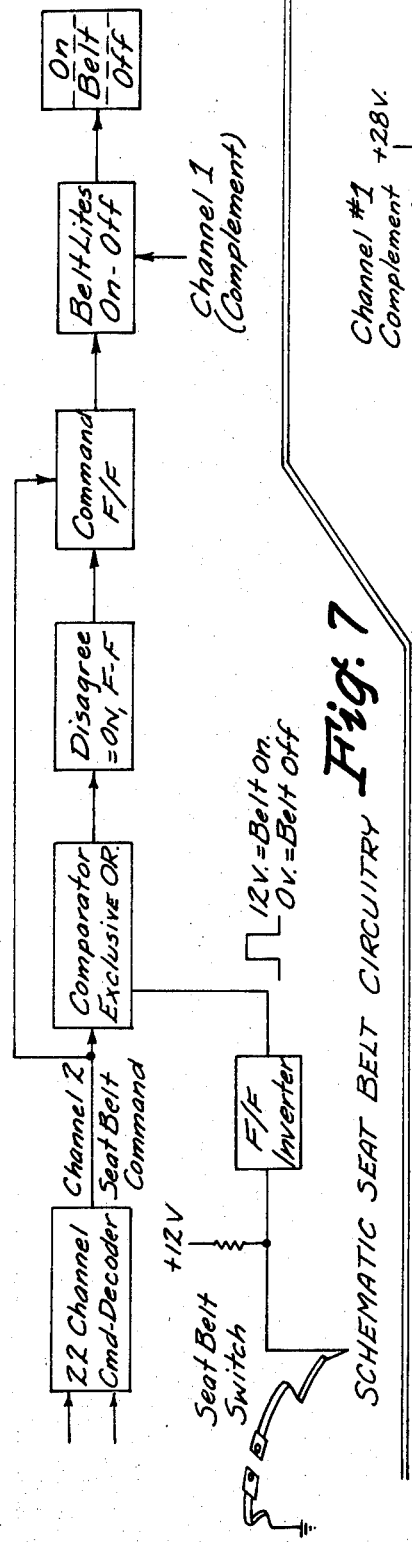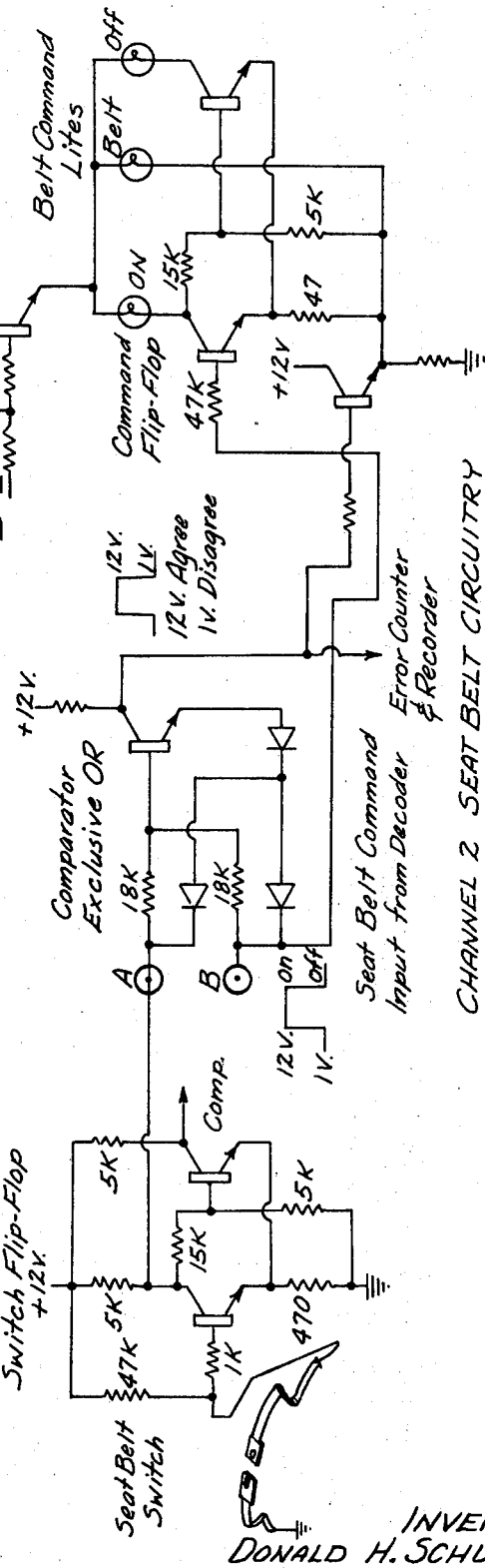

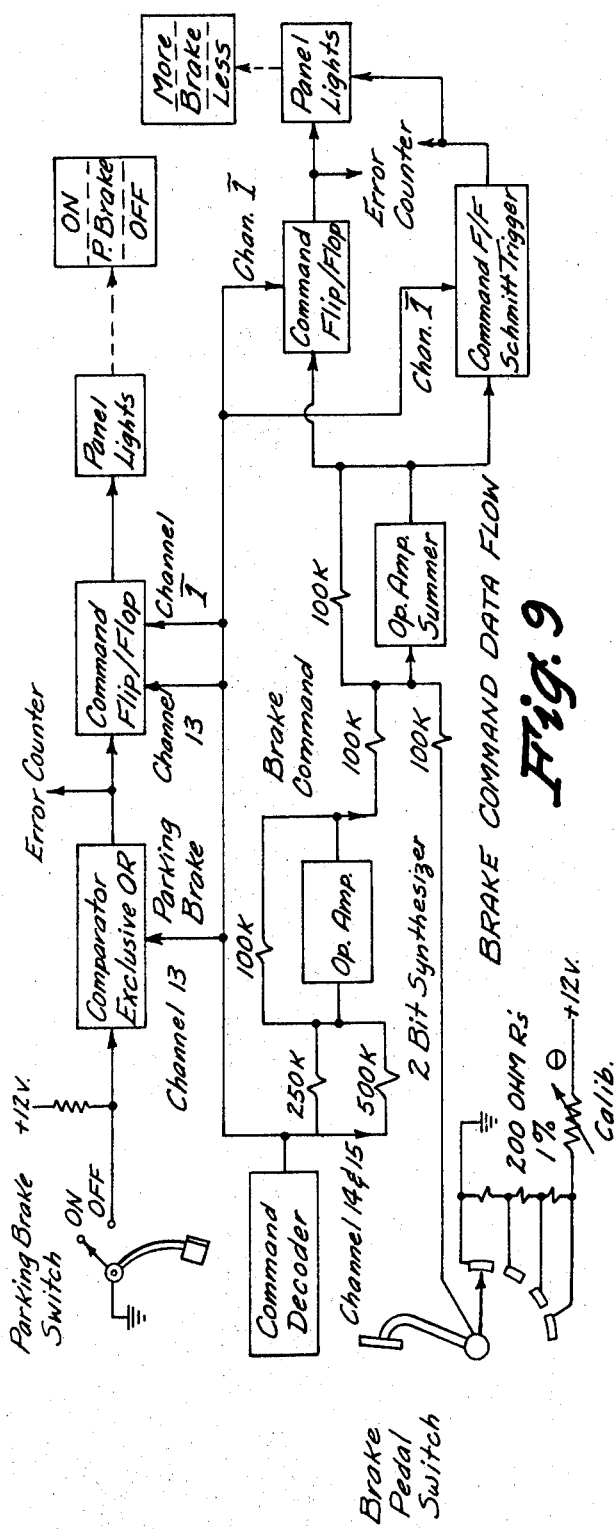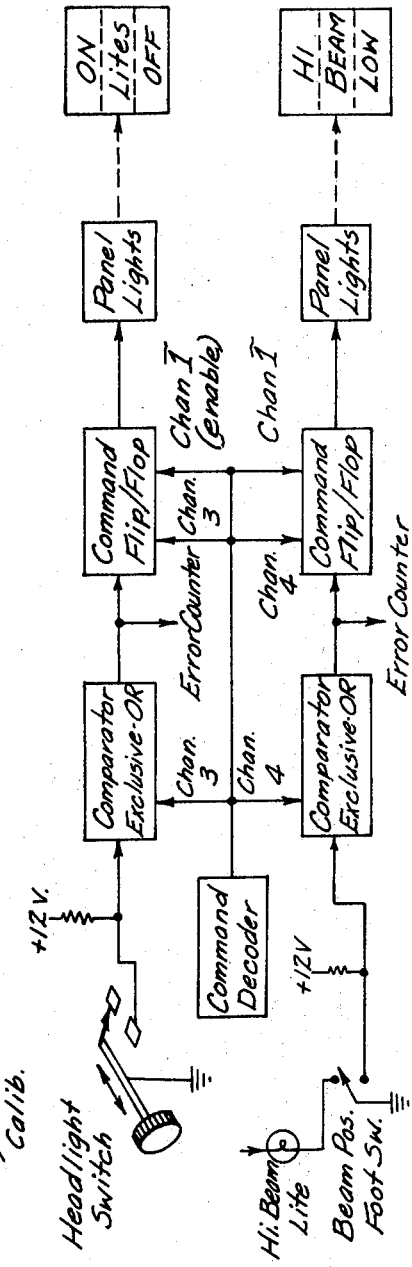

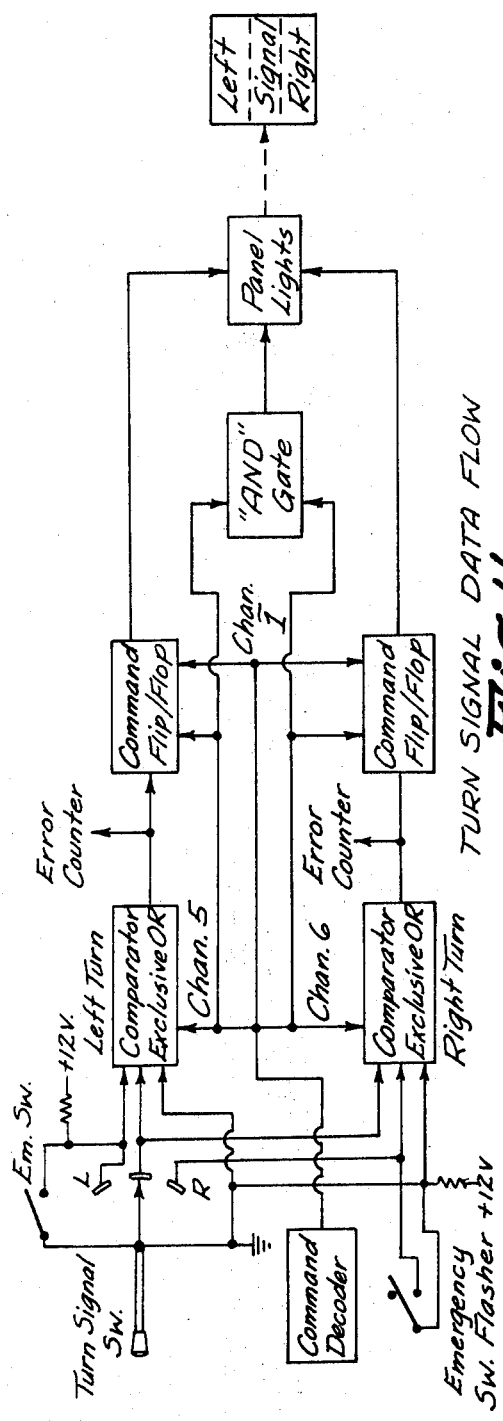
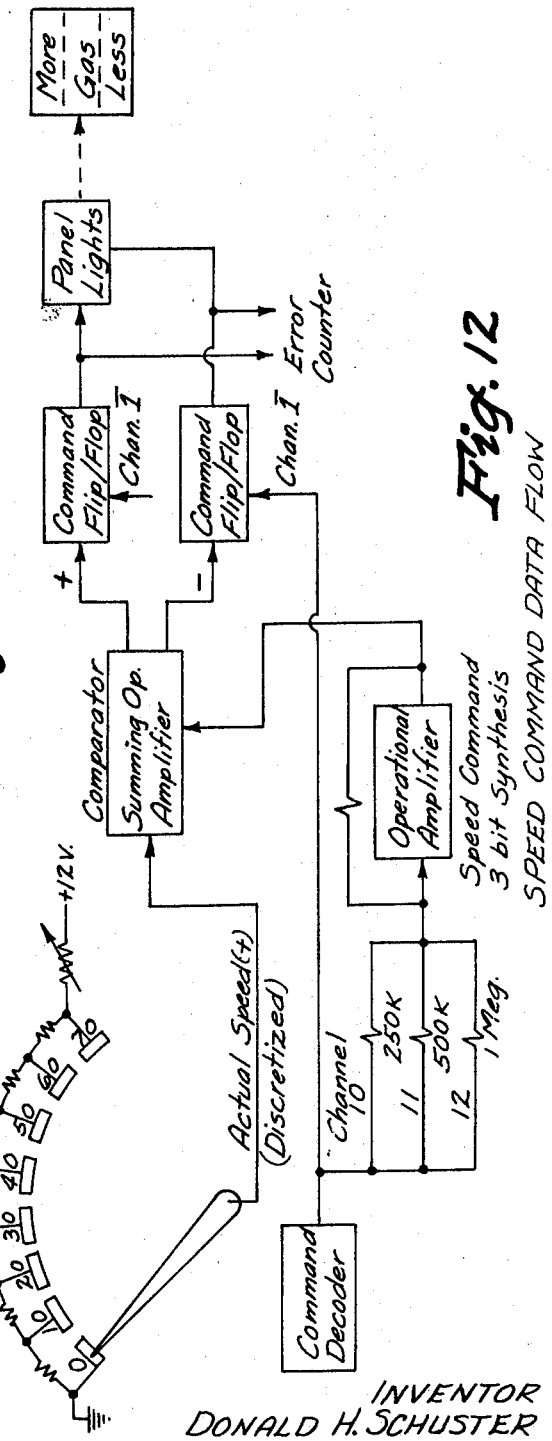

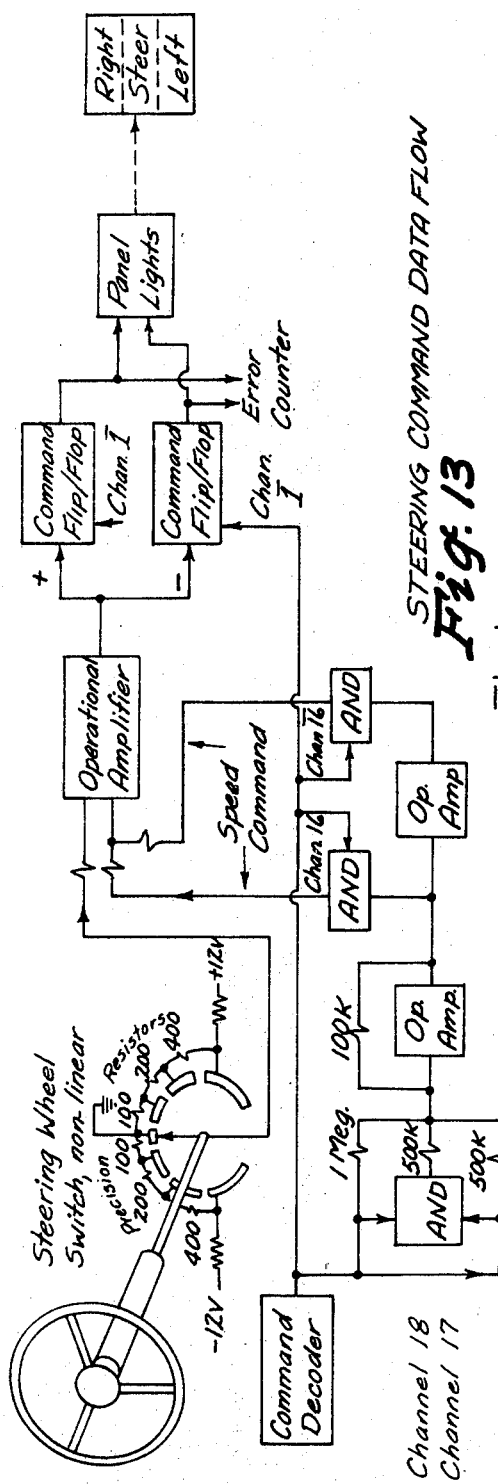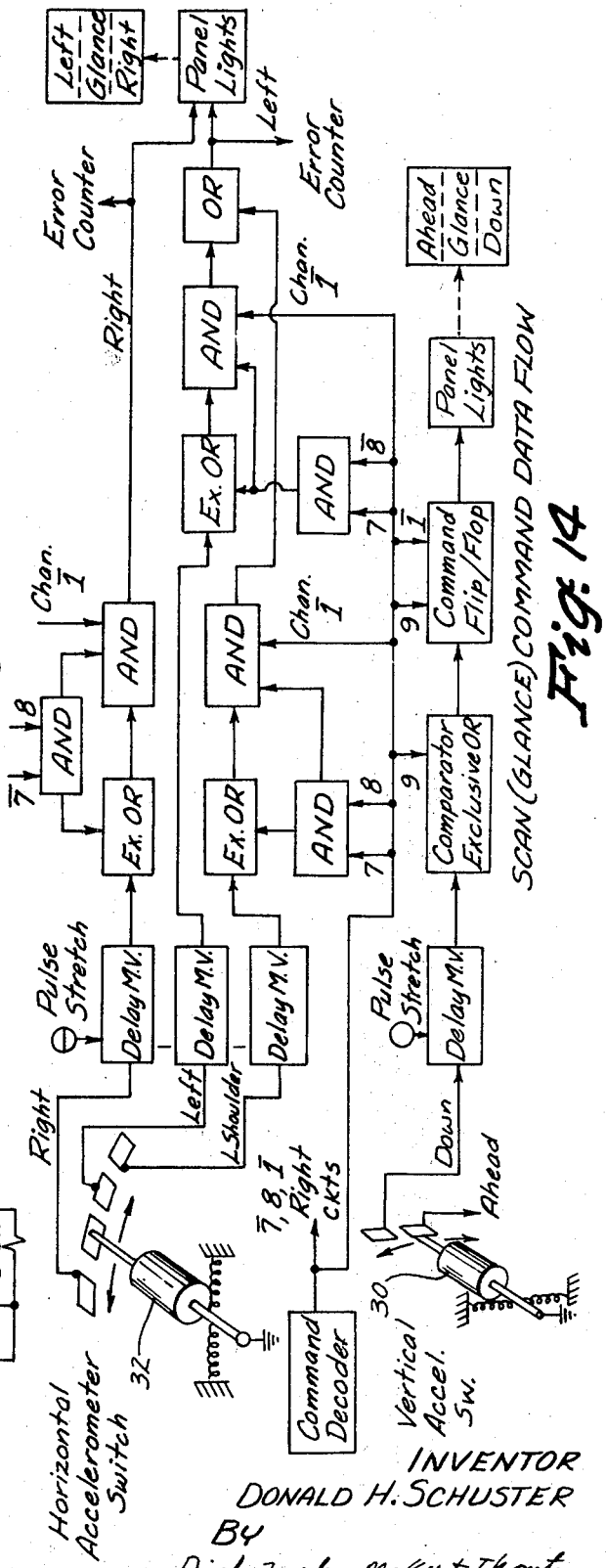

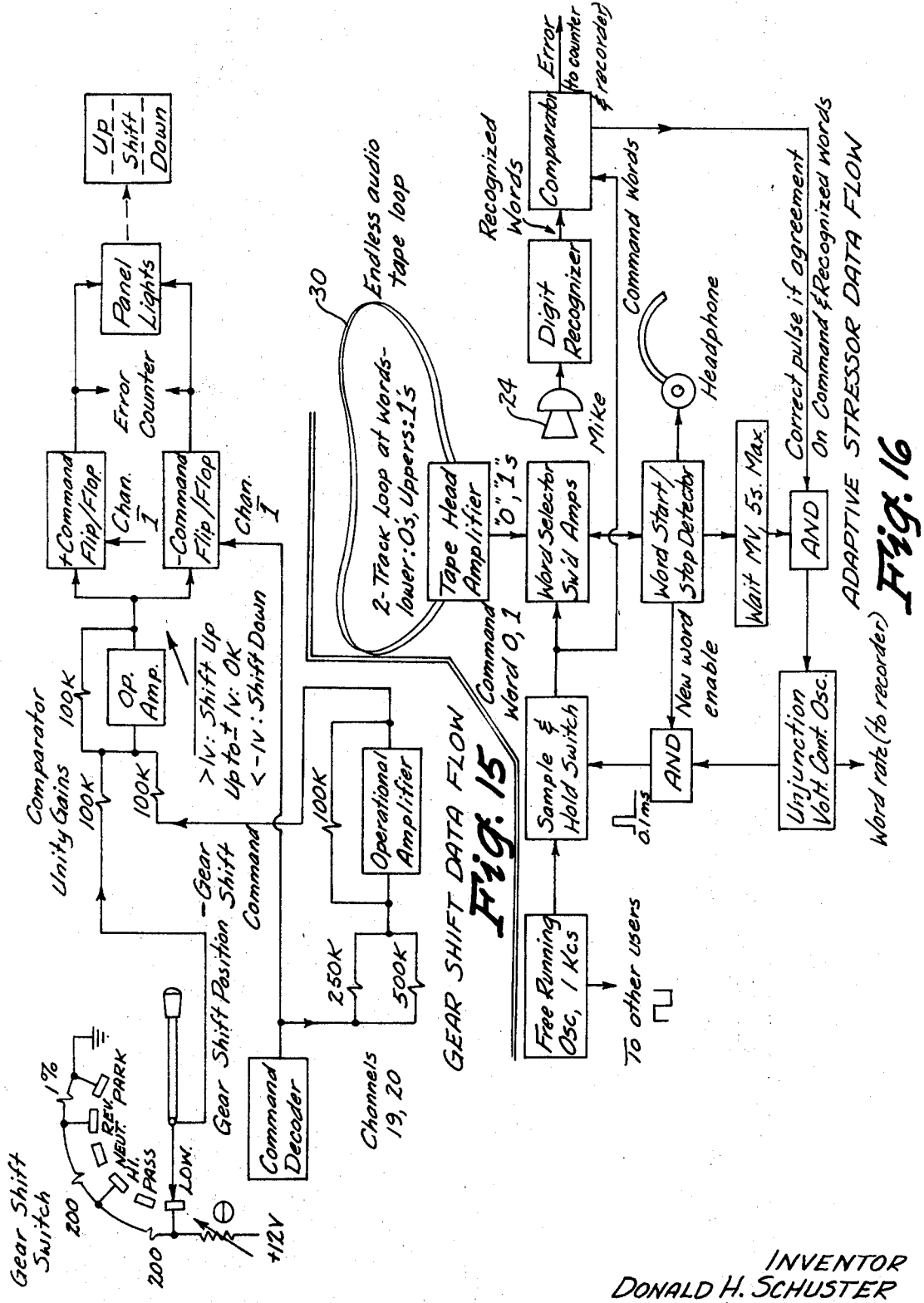

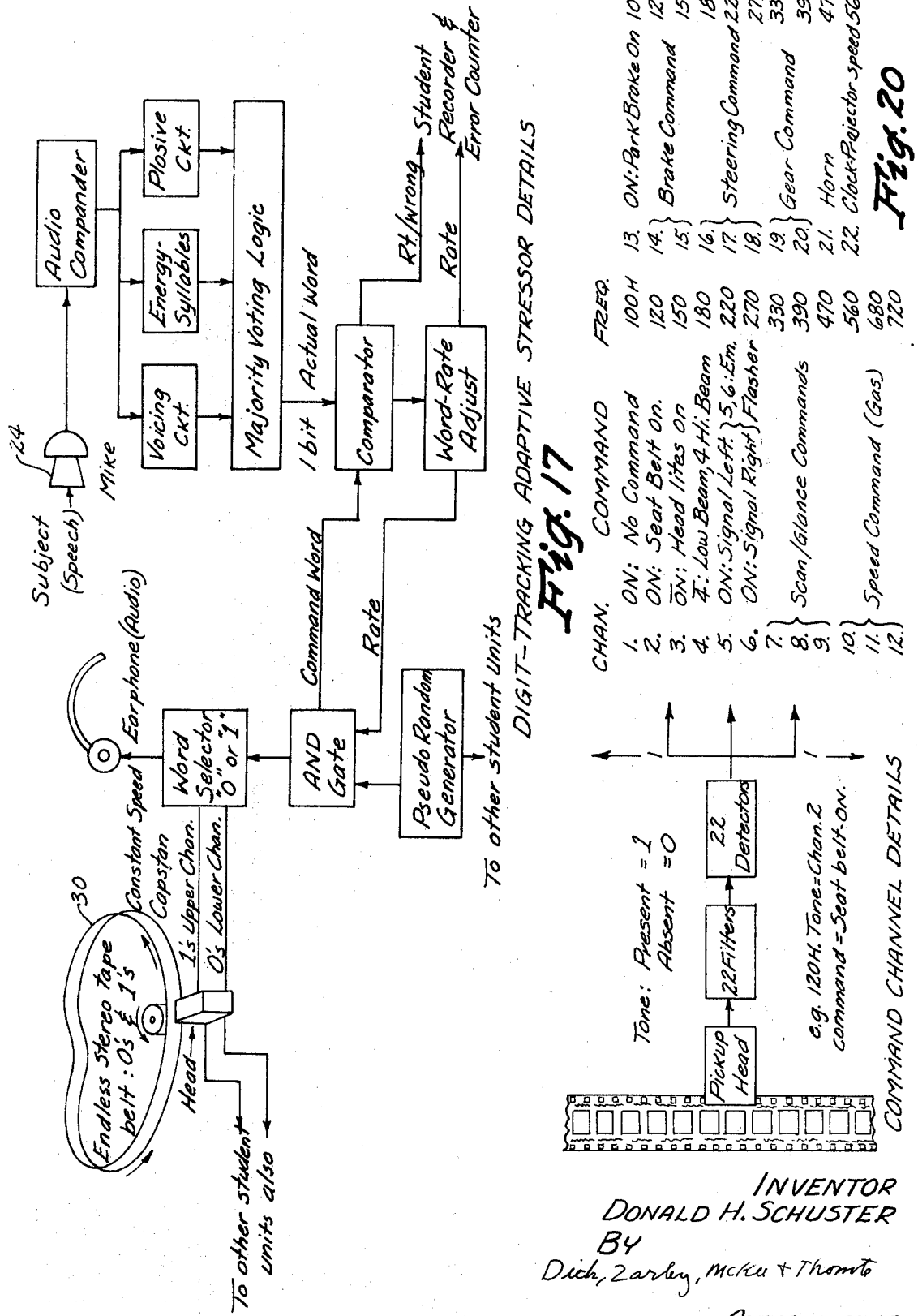

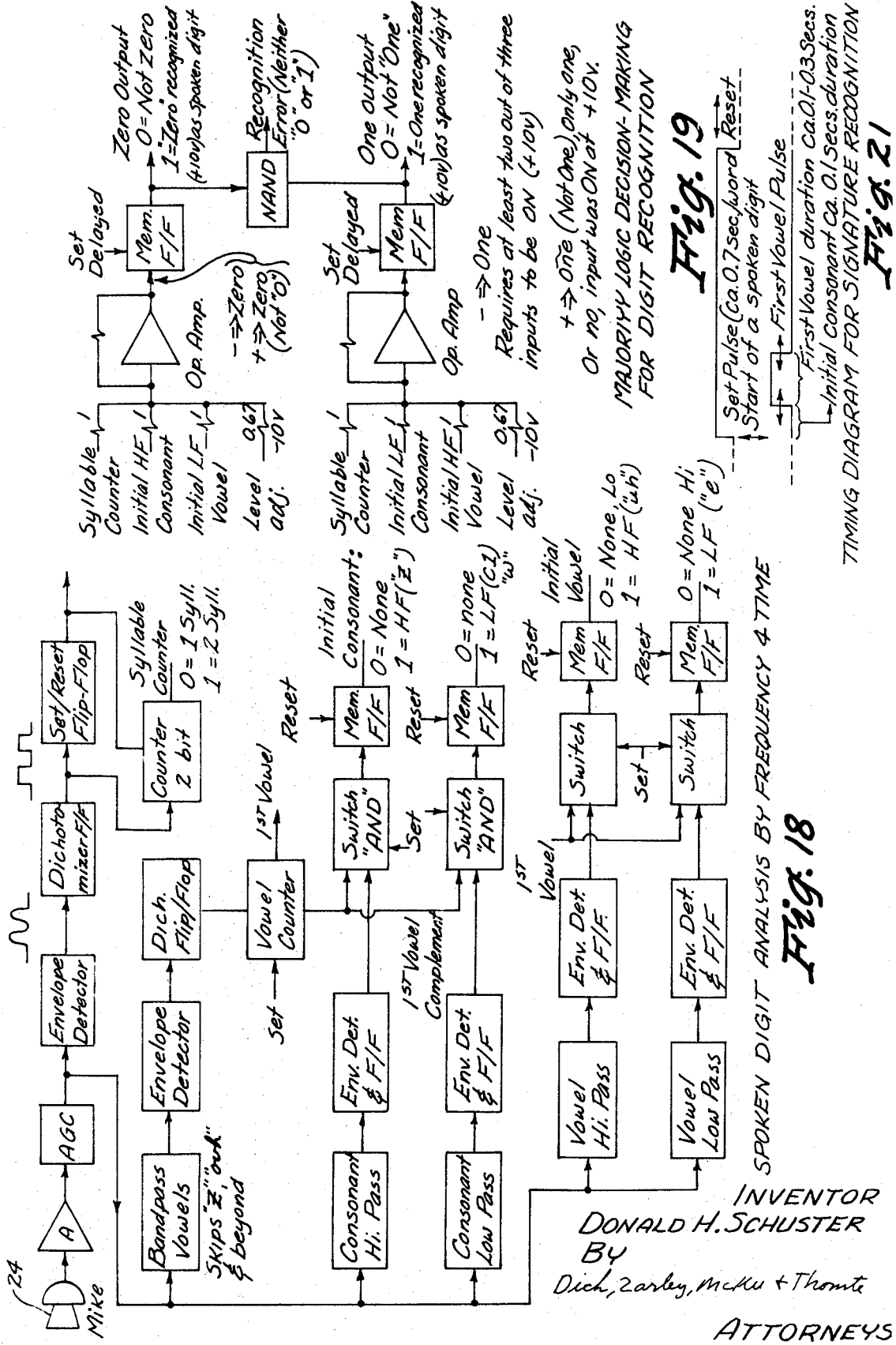

United States Patent Office 3,523,374
Patented Aug. 11, 1970

3,523,374
DRIVER TRAINING AND TESTING EQUIPMENT
Donald H. Schuster, 107 Hunziker Circle,
Ames, Iowa 50010
Filed July 21, 1967, Ser. No. 655,045
Int. Cl. G09b 9/04
U.S. Cl. 35—11  13 Claims

ABSTRACT OF THE DISCLOSURE

A driver trainer simulator involving a movie film for portraying a series of driving situations projected on a screen in view of a driver station on a driver trainer unit, the movie film being encoded with electrical signals which correspond to successive driving situations on the film and are compared with signals received from the driving controls of the driver trainer upon being operated by a student, an instantaneous display panel for indicating the correctness of the response by the student to each of the successive driving situations and a permanent magnetic recording means for storing the comparative information. An adaptive stresser unit having an audio unit may be simultaneously used to provide secondary auditory perceptual loading on the student. An auditory pattern recognition device including an audio pickup may be provided to receive the audible responses from the student in response to the sound patterns from the stresser unit. An indicator is provided for indicating correct and incorrect audible responses as compared with the audible responses from the audio unit of the stresser unit. The recognition device indicator may be coupled to the stresser unit to control the rate of loading of the auditory signals on the student.

---

Numerous studies have been made which indicate that neither improvement interviews nor special training classes are effective in causing problem drivers to improve in their driving skills more than the improvement resulting from those left alone for the same period of time. Group psychotherapy for problem drivers has also been used and proven ineffective. The results and conclusions from extensive experimentation and studies indicate that group psychotherapy, group driver improvement meetings, and special training for problem drivers are not effective in assisting problem drivers to improve their subsequent violation and accident records, compared to a control group. This invention is directed to what is believed to be an effective training equipment for problem drivers. This invention combines realistic driver training films with auditory shadowing which requres the subject to recognize and repeat spoken digits. Problem drivers will be induced to change their driving habits on the basis of undergoing operant training via realistic simulator and training movies as well as by the inclusion of spoken digit tracking as stress.

The theory of the use of this equipment is that the training group utilizing operant conditioning learning to cope with accident situations will utilize driver simulators to respond to potential accident scenes in films. The drivers thus consciously should learn to avoid the accident situation 100% of the time. However, the problem with problem drivers is that they know consciously the correct driving behavior to avoid accidents and moving violations, but they do not manifest this behaviour while driving. Therefore, this is corrected by having the students learn to respond to driving situations while they are stressed simultaneously. Thus the problem drivers will have learned how to react safely and subconsciously to accident driving situations in real life without having to stop and think about it, and in spite of a retained problem driving attitude.

Drivers will have the usual mechanical aspects of the car in the simulator and in addition feedback devices will be employed. For every safe response made to a potential accident situation shown in a driving scene the driver will receive a green light to signify correct behaviour. If the driver responds with some inappropriate response or too late, a legend panel will be lighted indicating the correct response that the driver should have taken to avoid the accident. Response scores will be recorded for each driver, and each driver will go through the driving films repetitively until he achieves the score of 99% correct responses on all of the potential accident scenes. A level of stress is added so that imposed by reacting correctly to potential accident situations depicted on the motion picture film. The controllable stress will be secondary perceptual loading. Each driver will be presented with a random auditory string of spoken zeros and ones. As soon as he hears a digit, the driver must simply repeat it aloud. A simple auditory pattern recognition device is used to determine whether the driver responded with a zero or a one, and whether he responded correctly within the appropriate time interval. The perceptual loading is adjusted for each subject by changing the rate of presenting the spoken numerals so that the accuracy of the secondary task automatically is kept at a level of 90%.

A further object of this invention is to provide a driver training and testing equipment device which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a general functional diagram of the present invention;

FIG. 2 is a detailed functional schematic diagram for the projector speed control;

FIG. 3 is a schematic diagram for the projector speed control;

FIG. 4 is a functional schematic diagram of the 21 channel command decoder;

FIG. 5 is an electrical schematic diagram of the 21 channel command decoder;

FIG. 6 is a diagrammatic representation of the instrument panel;

FIG. 7 is a functional diagram of the seat belt circuitry;

FIG. 8 is an electrical schematic diagram of the channel 2 seat belt circuitry;

FIG. 9 is a functional diagram of the brake command data flow circuitry;

FIG. 10 is a functional diagram of the headlight and beam command data flow circuitry;

FIG. 11 is a functional diagram of the turn signal data flow circuitry;

FIG. 12 is a functional diagram of the speed command data flow circuitry;

FIG. 13 is a functional diagram of the steering command data flow circuitry;

FIG. 14 is a functional diagram of the scan (glance) command data flow circuitry;

FIG. 15 is a functional diagram of the gearshift data flow circuitry;

FIG. 16 is a functional diagram of the adaptive stressor data flow circuitry;

FIG. 17 is a functional diagram of the digit-tracking adaptive stressor details;

FIG. 18 is a functional diagram of the spoken digit analysis by frequency and time;

FIG. 19 is a functional diagram of the majority logic decision-making for digit recognition;

FIG. 20 is a functional diagram showing the command channel details; and

FIG. 21 is a timing diagram for the signature recognition.

In FIG. 1 of the drawings a driver simulator is referred to generally by the reference numeral 10 and includes a seat 12. The usual driving controls are located on the front panel 14 of the simulator 10. A single ear phone headset 16 is provided for the trainee which although not shown will sit in the seat 12.

A movie film 18 that goes with the conventional driver simulator is used as the basic information storage element. On this 16 mm. film are the conventional scenes from driver training studies. At one side of the film images is the conventional sound tract 20. On the other side of the film will be an added ferrite strip 22 to record the necessary commands for this particular drive simulator.

On this ferrite strip 22 possible commands are encoded. The particular commands are detailed in FIG. 20. The commands are detected as tones on the ferrite strip as it runs through the movie projector and are translated into the appropriate command per channel. The presence or absence of the tone is taken to be the presence or absence of the command for this particular channel. The tone frequencies are decoded in the channel command decoder as a logical bit, that is a zero or one.

As seen in FIGS. 2 and 3, the 22nd channel at a nominal frequency of 5600 cycles per second, or Hertz, is used to control the frequency of the projector. This frequency in the 22nd channel is indicative of how fast the projector film is running at that particular instant. This frequency, indicating projector speed, is compared in a frequency discriminator with the command frequency from a reference oscillator whose frequency is fixed stably at 5600 Hertz. The difference is the error which controls the speed unit; this in turn controls the projector motor such that the speed of the film is controlled to be constant within very narrow frequency-speed limits.

What the student does in response to the driver training film and its commands is encoded by several devices on the student console. The information for these encoding details is shown in FIGS. 7–15. The motions or position information are sensed about the student's responses as to brake, clutch, gas or accelerator pedal, steering wheel, turn signal, miscellaneous switch operation, and glance direction.

The student wears a headset 16 for adaptive stressing while in the student driver console. This headset presents information in a headphone to one ear, while the other ear is free or uncovered to listen to the sound track from the driver trainer film. A microphone 24 is part of the headset to detect the student's verbal response to tracking digit commands. Also a part of the headset are two accelerometers to sense glance motions of the head. The ear phone and microphone are part of the digit tracking adaptive stressor loop, presented in detail in FIGS. 17 and 16.

The responses of a student are sensed at his student console and compared with the decoded commands from the driver trainer film in the comparator logic block. The errors or differences between command and student response are recoded on both a paper strip recorder as well as on a magnetic tape recorder for later computer analysis. The errors are also displayed as feedback information or commands to the student on his console display panel. This display panel has details given in FIG. 6. Further details on the command-response comparisons and their display are presented in FIGS. 7–15.

RESPONSES RECORDED AND COMMANDS DISPLAYED

The instrument panel in FIG. 6 indicates the types of information encoded and recorded which are as follow:

(1) Headlights, on or off and high-low beam position (2 bits).

(2) Turn signals, right, left or no turn signal (2 bits).

(3) Steering command, the direction of turn and four levels of turn non-linearly (3 bits).

(4) Brake command, four levels of foot brake pedal command (2 bits.) The parking brake requires an additional bit, on or off (1 bit).

(5) The gas pedal speed command, eight levels of speed (linear) (3 bits).

(6) Scan information, panel, road (vertical), two mirrors and left shoulder (3 bits). It would be nice to detect eye glance or eye scan, but the easiest thing to do here is to detect gross head motions in scanning, especially glancing over the left shoulder to check for rear traffic prior to passing.

(7) Seat belt, seat belt fastened or not (1 bit).

(8) Clutch and gear shift (2 bits). The clutch will be integrated with the gear shaft and the gear shift positions are park, reverse, low and high. The display panel will be energized by the comparator unit in response to error or difference signals between what the student is commanded to do at a particular instance and what he is actually doing.

(9) Horn, blow or not (1 bit).

(10) OK, no command (1 bit). This tells the student that no responses are necessary, that the student is performing OK and this will light the green light on the display panel.

The display panel will have two rows of lights. The top row is a single green light of low intensity that will be lit whenever the student is performing correctly (OK). If the student is not doing what expert drivers thing he should be doing in a particular scene shown on the driver ed film, this green OK light will go out and one of the information lights below will be lit. The information lights are one three-part row of lights. The top sub-row of the display panel for the information lights will be yellow indicating that the action generally will be "more" of the action involved. The center sub-row will be white to give the function of type of information required. The bottom sub-row will be blue, indicating that in general "less" of an action will be required.

The ten lights are as follows:

BRAKE, more or less.
P. BRK (Parking brake), on or off.
LIGHTS (headlights), on or off.
BEAM (headlight beam position), hi or lo.
GAS (gas pedal), more or less.
STEER (wheel commands), right or left.
SCAN, road or panel. (Head position to look at the road or the instrument panel.)
SCAN, right or left. (Glance to the right, or to the left, or over the left shoulder.)
SHIFT, up or down. (Shift through one of the four gear positions.)
BELT, on or off (seat belt buckled or unbuckled).

COMMAND CHANNEL DETAILS

In FIG. 20 details of the strip 18 of the 16 mm. movie film from one of the driver training series and the driving commands are illustrated. The normal sound track 20 is on the left of the film. At its right side is the added ferrite strip 22 for the multiplexed commands. A multiplex command channel is assigned a certain frequency as listed. For instance, channel 1 is the general enable command for the other commands. If this tone is present, none of the other 21 commands are present. This is assigned a frequency of 100 Hertz. Channel number 2 in contrast is a 120 cycle per second tone; its presence is interpreted as indicating that the seat belt should be fastened at that particular point in the movie.

The other channels are detailed similarly and their frequency allocation is given. For instance, channel 13 is a 1000 Hertz tone to indicate that the parking brake should be on.

The tones are processed into logic 1's and 0's as follows. The tones are detected on the ferrite strip of the movie film by the magnetic pick-up head and separated into 22 individual tones by 22 band pass filters. The outputs of the filters go to 22 detector channels with output digitally coded. A logical "1" means that the tone was present and has a voltage level of +10 volts, ±2 volts. If that particular frequency tone is absent, this is a logical "0" and has a voltage level of 0 volts, ranging from 0 to +2 volts.

DIGIT-TRACKING ADAPTIVE STRESSOR LOOP

Studies have shown that requiring a person to repeat a string of digits that he hears is stressful in terms of disrupting learned behavior. Following digits or digit-tracking in this case, means that the student has to divert some of his attention units from his primary task of driving the simulator and to following the auditory string of digits. The rate at which he follows digits here is a function of how correct the students are, this in turn depends on how much attention he devotes (or not) to his primary task of driving the simulator. Between these two tasks, driving the simulator and following digits, will occupy 100% of the student's attention.

The overall operation of the digit-tracking adaptive stressor as indicated in FIGS. 16–19 is as follows. An endless stereo tape belt 30 is used as the memory for the spoken zeros and ones digits for the student to track. The upper channel on the stereo tape belt has a continuous series of "ones" spoken on it at the rate of two digits every second. The bottom channel of this tape belt has a similar string of spoken "zeros" recorded on it. Thus one can get a spoken zero or one merely by selecting the upper channel for ones or the lower channel for zeros. The selection of the desired digit is done by the pseudo-random number generator. The rate at which the digits are picked off the tape sets the rate at which the spoken digits are presented in the earphone to the student. The rate at which spoken digits are presented is controlled by the comparator, which sets the word rate according to how accurately the student is following the random string of spoken ones and zeros.

Auditory pattern recognition techniques are used to determine whether the subject said, "zero" or "one," or some other number (an error). The microphone 24 on the subject's headset detects the spoken digits and converts them into the corresponding electronic waveforms. The audio commander insures that the volume level feeding the pattern recognition circuits is constant. The auditory pattern recognition scheme utilizes three different characteristics of spoken speech in combination to determine whether a zero or a one or something else was said by the subject. These characteristics are explained in detail below and the electronic implementation is given in FIGS. 18 and 19 for the pattern recognition.

PHONEMIC ANALYSIS OF THE SPOKEN DIGITS "0" & "1"

0. Zēē'-rōh    Voiced sibilant, vowel ē / short liquid, vowel ō LF buzz (vowel)
alt. (Zĕr'ōh) + HF "s"    (V1∩C4)V2(-∪C2)/(C2∪-)V3-

1. Wŭn    Plosive, continuant, vowel ŭ, nasal / VHF "s" transient (Semi-Vowel)
alt. (Oŏh-Wŭhn')    (-∪V5) C1 V4 C3/-

Frequency and time "signatures"

∪ = union, "OR"    / = pause
∩ = intersection, "and";    - = no sound

| | Characteristic | 0 | (alt.)0 | 1. | (alt) |
|---|---|---|---|---|---|
| First Syllable | Initial sound | Z: HF "s" V1 & LF buzz C4 long dur. | Same | W: [VHF Oŏh: preliminary short timed ← semi vowel Oŏh, short time C1+ swept LF V5 | |
| | Vowel | V2 ē | (Same) | V4 ŭh | (Same) |
| | Final sound | - (none) / pause (no energy in sound) | C2 r | C3 n | (Same) |
| Second Syllable | Int. sound | C2 r | - (none) | - none | |
| | Vowel | V3 ō | (Same) | - none | |
| | Final sound | - none | none | - none | |

Vowel & consonant coding by major audio frequency

V, Vowel sounds:   z    ē    ō    oŏh    ŭh
rel. freq. order: 1 lo. freq.   2   3   5 hi   4

C, Consonants:   z    r    w    n
rel. freq. order: 4 hi. freq.   2   1   3 sl. swp up
                                               [(+VHF "s")]

time per vowel & consonant relatively constant.

The output of the three speech characteristic circuits are each coded as one or zero, that is the output of the voicing circuit (vowel detector) could be a logical "one" indicating a spoken one also or it could be a logical "zero" indicating a spoken zero for consistency purposes. The energy-syllable detector and the plosive circuitry (consonant frequency) operate likewise. A majority voting logic is used to insure reliability. The majority voting logic thus requires a two out of three or a three out of three vote from the three circuits for reliable recognition. If an accuracy level of 90% for each circuit individually is assumed, then operating collectively the circuits should be right 99% of the time or 99.9% of the time when the 3 out of 3 circuits agree. Using the two out of three decision-making logic thus means that an error would be made only once out of 100 times, when two out of the three decisions are wrong and the minority vote was correct. The output of the pattern recognition circuitry, the majority logic output, is a logical zero or one, corresponding to a spoken "zero" or "one." This is compared with the command word and used to adjust the rate of presenting digits to the subject.

The word rate adjusting feature works as follows: if the student is correct, the rate of selecting and presenting words to the subject increases slightly with each successive correct following of digits. If the word recognized is wrong, opposite to that presented to the subject, the rate will decrease abruptly down to some minimum level of presenting digits to the subject. A possible minimum level is one digit every three to five seconds and a possible maximum level could be two digits per second.

The student console responses, errors and digit rate are recorded. A paper strip recorder is used for feedback to the instructor and student analysis later. A magnetic tape recorder for feeding the data into a computer for subsequent statistical analysis is also used.

HEAD MOTION SENSOR DETAILS

Two accelerometers 30 and 32 as seen in FIG. 14 are used to detect head motion in the vertical plane or horizontal plane. In the horizontal plane, a pendulous mass can swing left or right, indicating the opposite glance position due to the inertia of the accelerometer mass. Horizontally there is just one right position, but two left positions. This left shoulder motion may be non-linear in the sense that considerably more head motion can be required for left shoulder glance detection. The vertical accelerometer has just two positions to detect, straight ahead or the road and the glance-down condition.

If desired, eyeball position and sensing devices could be employed but this would require attaching a mirror to the eyeball or attaching two bipolar leads to a person's face so that the electrical potentials from the eye could be detected and displayed. The vertical accelerometer is simpler but does require that the subject make actual head motions even though slight to indicate his direction of glance or gaze.

VEHICLE CONTROL SENSING DETAILS

Referring to FIG. 10 it is seen that the headlight switch is a single pole double-throw (SPDT) switch that is added in parallel to the light control itself so that the position of the switch may be sensed. The light beam position sensor switch is a relay added across the high beam light for the purpose of repeating the beam position information.

The speedometer sensor switch (FIG. 12) is a linearly quantized switch that picks up bands of speed information by ten miles-per-hour increments. The center of each band is restrained to lie on an even multiple of ten miles-per-hour.

The seat belt sensor switch (FIGS. 7 and 8) is constructed by incorporating a flexible wire into the seat buckle harness and using metal buckle contacts so that when the belt is buckled the switch is closed (or on).

The parking brake pedal (FIG. 9) has a single pole double throw (SPDT) switch attached to its mechanism to repeat the "parked" (or barke on) position in contrast to the off position when the car is moving. The clutch pedal switch (not shown) operates similarly, except that the clutch "down" position is sensed over a more considerable range than is the "off" sensing of the parking brake switch.

The brake pedal switch (FIG. 9) senses four positions of the brake pedal, no braking applied, ⅓ maximum, ⅔ maximum, and maximum braking position or effort. This may be changed from a linear quantization to a nonlinear one; mild braking might be something like 25% of maximum braking and moderate braking might be something like 50% of the maximum or 100%.

The gas pedal sensor (not shown) functionally works in conjunction with the speed sensor. Here again the gas pedal position information is similar to the brake and is quantized into four levels, none, ⅓, ⅔ and maximum gas feed or gas pedal position. Again a nonlinear quantizing might be appropriate for this as for the brake pedal information.

The basic sensor for the steering column is (FIG. 13) the steering wheel position switch. A three bit position code is used for steering wheel information. The first bit refers to direction left or right. Two bits remain for quantity information; they are nonlinearly quantized, a slight right is ¼ maximum, moderate right is ½ maximum right effort, and hard right is 100% maximum right effort. The complement holds true for left turn information.

The turn signal indicator (FIG. 11) is simply a single pole three position (SP3T) switch on the steering arm and simply repeats the turn signal information appropriately.

The gear shift level information (not shown) is repeated in four levels in terms of park, reverse, low and high. The positions of pass and neutral are ignored in the later electronic implementation.

CHANNEL COMMAND DECODER

This is the electronic circuit shown in FIGS. 4 and 5 that picks up the 22 channel frequencies from the ferrite strip 22 on the film, converts them into electrical signals corresponding to frequency and then detects the presence or absence of the various frequencies as the 22 channel commands.

In FIG. 4 is shown a block diagram. The signals corresponding to the 22 frequency tones on the film ferrite strip are picked up on a conventional magnetic head 34 with a frequency response from 50 to well over 5000 cycles per second frequency response. The signals are amplified and then limited such that the signals are constrained to have a constant amplitude at the output of limiter. Then a driver amplifier with a low output impedance and sufficient power drives the tuned or frequency selective amplifiers. The gain and frequency response of each of the tuned or selective amplifiers are adjustable independently. The output of the selective amplifier is a logical one or zero depending on the presence or absence of that particular tone frequency at that spot on the movie film. The channel logic outputs go to various places as the action commanded at that particular point in the movie scene.

The electronic circuitry is fairly standard. A conventional magnetic tape pre-amplifier is followed by a diode limiter circuit. The overall gain is adjustable into an amplifier and driver. The tuned amplifier is tuned by means of a slug in the core of the inductance L. The circuit resembles a Colpitts oscillator but operated with a gain below one, adjustable by means of the collector resistor. The Q of the circuit is related to the stage gain, ringing from about 0.1 to just short of stable oscillation at unity gain.

The tuned amplifier feeds the detector or tone flip-flop logic circuit. The input diode shunts the negative halves of the amplifier's sine waves to ground, leaving only the positive halves which are integrated by the filter capacitor across the diode. Whenever a signal from the tuned amplifier is available at the diode, the first transistor in the flip-flop is biased ON. When the tone frequency is absent for that particular channel, the input transistor will have no bias and consequently will be cut off. The output transistor of the flip-flop complements this information, so that two outputs are available: an output of +12 volts available ("ON") whenvere the particular tone frequency is present and the complementary output having an output of +12 volts whenever the tone is absent ("OFF").

The tone flip-flops and selective amplifier circuits are repeated 22 times, once for each channel.

PROJECTOR SPEED CONTROL

The block diagram in FIG. 2 shows this data processing. The film speed is picked up by the frequency of channel 22 from the command-decoder unit. The nominal frequency is 5600 Hertz. Its possible that this frequency will have to be raised somewhat higher in order to provide sufficient discrimination from the next lower channel. The tone frequency for channel 22 is amplified and limited to provide a constant amplitude signal. This feeds one input of the discriminator which controls the SCR or silicon controlled rectifier. The other input to the speed control discriminator comes from the reference oscillator which is held very stably at 5600 Hertz regardless of temperature and voltage variations. This signal frequency also is limited and fed to the SCR, but in a sense opposite to the signal coming from the film speed via the decoder. The two signals add algebraically and the error or difference signal controls the SCR firing, controlling the projector motor speed.

Circuitry details are shown in FIG. 3. The clock signal, channel 22, comes from the command decoder and goes through a pair of forward biased diodes to provide the signal limiting for constant amplitude tone. This is fed via a rectifier which passes only the negative half sine waves to the discriminator and SCR control. The reference oscillator is a standard Hartley oscillator feeding an emitter follower to provide isolation and low output impedance. This reference oscillator signal also goes through a limiter composed of oppositely polarized forward biased diodes. The gain of the limiter amplifier is controllable so that the two signals may be made comparable in amplitude as they feed the discriminator.

The SCR is biased ON by the plus output from the reference oscillator initially to bring the projector motor up to speed. The motor speed increases until the channel 22 negative output voltage approximates that of the reference oscillator. Then proportional control occurs to keep the motor speed constant with channel 22 frequency at 5600 Hertz. A reversed-biased diode across the SCR provides for current through the projector motor on the opposite half sine waves from the AC supply, and a series resistor allows for adjusting the motor speed as desired.

VEHICLE CONTROL CIRCUITRY

The logic or data flow for the seat belt circuitry is shown in FIG. 7 as discussed supra. As seen in FIG. 20, channel 2 has the seat belt command at a frequency of 120 Hertz. This feeds an exclusive OR comparator circuit as well as the command flip-flop. The seat belt switch when closed produces an OFF output pulse which is changed in a flip-flop inverter to plus 12 volts (ON). The logic levels are that a 12 volt signal indicates a logical (1) from the flip-flop inverter for the seat belt switch closed. When the seat belt is open, a zero voltage level signifies a logic level of "0." The exclusive OR circuit compares these two inputs and when the two agree at either logic level, the output of the comparator circuit is a logical zero (0 volts). When the two inputs disagree, such as when the seat belt command is for the belt to be fastened and the belt actually is not, the comparator output is a logical "1" (+12 volts).

The command flip-flop is enabled by the positive output of the seat belt command channel 2. If the seat belt were already fastened, and a seat belt command present, then the belt light would stay off. If the seat belt command were present but the seat belt actually not fastened, then the seat belt light would come on, as enabled by a lack of a command from channel one. Then the BELT ON light would be lit. When the person leaves the car, the seat BELT OFF light would come on.

The seat belt circuitry is shown in FIG. 8. The switch flip-flop for the seat belt inverter is a conventional bistable multivibrator or transistorized Schmitt trigger. This inverted output of the switch goes to the A input of the exclusive OR circuit, the comparator. The operation of the exclusive OR circuit was described above: if the two inputs agree, either both ON or both OFF, the output is a logic one (+12 volts). If the two inputs disagree by being at different logic levels, then the output is about zero volts (a logic zero). A disagree output goes to the error counter and two recorders whenever the two circuits disagree.

The command flip-flop controls three lights. Whenever the channel 1 complement ($\bar{1}$) as an enabling signal is present, the emitter follower feeding collector voltage to the command flip-flop is energized. If there is an error signal from a comparator circuit, in the absence of a channel 1 complementary signal the lights will stay off. If there is a disagree signal the BELT light will be energized because it is independent of the command flip-flop. The belt light is turned on by the emitter follower for channel $\bar{1}$ (the enable signal) as well as by the emitter follower from the comparator circuit to a negative supply voltage. If the command is for the seat belt to be fastened and the comparator indicates a disagreement between the command and seat belt position, then the command flip-flop left transistor will be energized and the ON light will be indicating that the seat belt should be fastened. If the comparator says that there is a disagreement between the seat belt position and the command, but that the command itself is off, then the command flip-flop will have the right transistor ON, thus energizing the OFF command light for the seat belt.

Details of the headlight functional circuitry are very similar to those shown previously for the seat belt circuitry. In this regard however see the block diagram of FIG. 10.

The headlight switch is one input directly to the comparator, an exclusive OR circuit, while the channel 3 decoded command, whether the light should be on or off, is the second input. The disagree output of the comparator goes to the error counter as well as energizes the command flip-flop. The command flip-flop will have the center light turned on if there is a command disagreement and channel $\bar{1}$ signal. If the command indicates that the lights should be turned ON and they are not, then the ON light will be lit, whereas if the command is for the lights to be turned off, then the other transistor will be conducting indicating lights OFF (headlights should be turned off).

A similar situation exists for the beam position foot switch, controlled by channel 4. A channel 4 signal indicates a high beam position if a logic 1 exists otherwise a logic 0 indicates low beam position. The channel 4 beam position command is one input to the comparator and the other is directly from the beam position foot switch itself. The output goes to a command flip-flop as above indicating that the beam should be turned to high or low, depending on the particular command.

It is seen in FIG. 11 that for the turn signals two channels feed inputs into the turn signal data flow, channel 5 indicating a left turn command (logic level "1" or +12 volts) and channel 5 indicating a right turn (logic level "1" or +12 volts). If signals are present in both channels 5 and 6, then the emergency flasher should be turned on where both the left and the right portions of the indicator lamps are lit.

The turn signal switch feeds into two comparators, the left signal from the switch goes into the left turn comparator. If there is disagreement, there results in the LEFT signal light's being energized. If the turn signal switch is turned to the right position, the right turn comparator takes this signal; if there is a discrepancy the appropriate command flip-flop will energize the RIGHT signal lights. If the emergency flasher switch should be turned on, both left and right turn signal commands are fed simultaneously into both comparators via two separate sections of the emergency flasher switch. An AND gate senses this and over-rides the command flip-flops with the result that both the LEFT and RIGHT lights are lit.

Circuitry details are similar to that for the seat belt circuitry (FIG. 8).

The glance commands are as follows: (FIG. 14) channel 7 command only is interpreted as a left glance command, a channel 8 command only is interpreted as a right glance command, but both channel 7 and channel 8 commands together are interpreted as a left shoulder glance which is considerably larger in magnitude than a left glance command by itself. The channel 9 command by itself is indicative of the command to glance down at the instrument panel.

The above two features make the glance command somewhat different in its implementation than previous commands. First is that a left shoulder command is in the same direction as a left glance command but of greater magnitude. The second feature is that glances are temporary or brief events whereas the command itself may be present for a period of several seconds. The glances themselves are stretched or extended in time by delay multivibrators so that a glance may be stretched out for a priod of two to three seconds so that it may coincide with the actual command signal. The glance signals may be stretched to longer time intervals as required in the individual case. The stretching circuits simply are delay multivibrators which are turned on by the accelerometer switch when the appropriate contact is made even though momentarily. After the accelerometer switch contact is broken, the delay multivibrator continues to put out a logical signal until several seconds have passed. The stretched signals are fed appropriately to comparator logic of the same type as previously. Exclusive OR circuits form the comparator circuits whereas the appropriate gating is done by AND circuits.

The right glance command signal is the simplest. A right glance results in the accelerometer switch momentarily energizing the contact labeled "right." This feeds the delay multivibrator which puts out a stretched right glance signal. This stretched signal is compared in the exclusive OR circuit with the right glance command (channel 7 off and channel 8 on. If there is an agreement no signal comes out of the AND gate. If the command and right glance stretched signal disagree, then the panel light is lit appropriately to show that a right glance is required.

A similar situation obtains for a left glance signal by itself.

The left shoulder glance is complicated by virtue of the fact that an additional AND gate is required to detect the presence of both a channel 7 and channel 8 signal. From there on the circuitry is about the same with the exception that the left shoulder glance is fed via the left glance flip-flop circuitry. Thus if the driver already had glanced left and the left signal stretcher yet had an output, but a left shoulder glance were required, there would yet be a discrepancy in the AND circuit at the output of the exclusive OR. Only when the left shoulder glance command and an output from the left shoulder delay multivibrator were present would this exclusive OR circuit output be zero indicating agreement and the left glance signal then would disappear.

The glance down command to look at the instrument panel is simple compared to the left-right glance circuitry. The vertical accelerometer switch is energized by a nodding of the head in the vertical plane. This vertical nodding of the head is detected by the accelerometer switch and results in a stretched or delayed output from the pulse stretcher. The stretched vertical signal is compared with the channel 9 command; if a disagreement exists the command flip-flop is energized appropriately to indicate GLANCE DOWN or GLANCE AHEAD, that is, look back at the road.

Channels 10, 11 and 12 are utilized to form the three bit speed command (FIG. 12). The channel 12 signal is the least significant bit and the channel 10 signal the most significant bit out of the three. The three bits are arranged linearly to give 8 levels of speed command by ten mile-per-hour increments centered at 0, 10, 20, 30, 40, 50, 60 and 70 m.p.h.

The speedometer switch is a precision quantized voltage divider or potentiometer with eight discrete levels precisely determined. The speedometer arm switch is arranged to pass over successive linear switch intervals. Precise voltage levels appear on each of the switch segments. The voltage levels can be adjusted and precisely related such that the 10 m.p.h. switch segment actually has +1.0 volt on it and the 70 m.p.h. switch segment has exactly 7.0 volts on it. The calibration variable resistor sets this voltage precisely and the use of 1% precision resistors are sufficient to insure the necessary precision. The 12 volt regulated supply is a necessity here. The output of the speedometer arm thus is a quantized signal that varies in 1.0 volt increments to be the analog of the speed at which the simulated car is traveling. This is one input to a summing amplifier.

The second input to the summing amplifier is the channel speed command that is the three bit synthesis of the commands from channels 10, 11 and 12. The channel gains are 0.4 for channel 10, 0.2 for channel 11, and 0.1 for channel 12. Thus a 12 volt command from channel 12 would be multiplied by 0.1 resulting in an output of −1.2 volts from the operational amplifier. The slight differences in voltage levels are made up by the calibration resistor on the speedometer. The operational amplifier thus synthesizes appropriately the necesary speed command. The second summing operational amplifier in the center of the page compares the actual speed from the speedometer with the synthesized sped command from channels 10, 11 and 12. If the commanded speed is more than the speedometer indication, the positive command flip-flop is energized and the panel light will be energized indicating "MORE GAS." If the actual speed commanded is less than indicated by the speedometer, the reverse is true and the display light will indicate "LESS GAS."

Undesirable transients may arise as the speedometer switch goes from one switch section to the next. A break-before-make contact, as shown, would result in a momentary speed signal dropout. A make-before-break contact would give an imprecise voltage dividing action as the switch contact shorted two adjacent contacts in passing. This latter action is preferable to the former. But even these minor switching transients may be avoided with a snap action, or toggle, from one section to the next. A cam operating snap action microswitches in sequence is one possible implementation; toggled photoelectric relays sensing the speedometer needle position is another.

Channel 13 is utilized to idicate a parking brake command (a logic "1", +12 v., indicates that the parking brake should be ON). The implementation of the parking brake command is relatively simple (FIG. 9). The channel 13 parking brake command is compared in an exclusive OR circuit with the actual position of the parking brake. If a discrepancy exists, the appropriate parking brake command is illuminated.

Channels 14 and 15 together indicate the appropriate brake pedal command. A linear quantization of brake magnitude is indicated. That is, no brake command is signified by the combined absence of channels 14 and 15. A ⅓ maximum brake command is indicated by the presence of a tone signal on channel 15 and not on channel 14. If tone signals are present on both channels 14 and 15, maximum brake is indicated. A possibly better alternate to this linear braking is: a channel 15 signal would indicate ¼ maximum braking, the channel 14 signal would indicate ½ maximum braking and a signal in both channels 14 and 15 would indicate maximum braking.

This synthesized negative brake command is compared with the actual linear discretized brake position information from the brake pedal in the comparator operational amplifier.

If the brake command was greater than the brake position, the comparator output would be positive, indicating more brake pedal effort. If the net input had been positive with a correspondingly negative output, less brake effort would be required. If the two comparator inputs were equal and opposite in polarity, this would indicate no command; the brake pedal position just equalled and counterbalanced a synthesized brake command with a tolerance of ±1 volt. The brake pedal switch should have a snap action from one segment to the next.

A three bit synthesized command is utilized for the steering control (FIG. 17) here. The first bit, channel 16, indicates turn direction: lack of a channel 16 tone or command indicates a left turn, whereas the presence of the channel 16 tone signal results in a right turn command. Channels 17 and 18 together synthesize a two bit quantity for magnitude of steering command. Lack of a tone in both channels 17 and 18 means no turn or straight ahead. A tone present only in channel 18 is indicative of turning ¼ of maximum. A tone present in channel 17 only is indicative of a command to turn ½ of maximum. A tone in both channels 17 and 18 is indicative of turning the maximum amount. The direction is indicated by channel 16 in all cases.

The steering wheel switch operates as follows. In the upper left hand position of FIG. 13, the switch arm snaps from one segment to the next. The quantization is non-linear as indicated by the switch segment widths and the corresponding resistor values reflecting them. When the steering wheel is moved off the center positions segment up to ¼ of maximum, a contact with the first switch section connected to the 100 ohm resistor is made. If additional effort is applied to the steering wheel, the switch arm contacts the segment connected at the top of the 200 ohm resistor. If a steering effort between ½ and maximum is made in either direction, the last switch segment in either direction is contacted. Note that steering wheel direction is indicated by having the switch segments to the left connected to a minus 12 volt supply and those to a right connected to a plus 12 volt supply.

The steering wheel also can be linked mechanically to the hood of the console so that the hood could be made to move back and forth realistically as if the car were changing lanes or moving laterally on the road surface.

The command decoder utilizes channels 17 and 18 for the magnitude command synthesis. An AND gate is used to sense when commands for both channels 17 and 18 are present to increase the gain into the operational amplifier. Otherwise channel 17 by itself has a gain of 0.2 and channel 18 by itself has a gain of 0.1 to indicate ½ and ¼ of maximum turn respectively. The output of the first operational amplifier thus reflects the two bit non-linear synthesis of the commands of channels 17 and 18. The channel 16 command selects either the negative steering command from the output of the synthesizing operational amplifier or the output of the second operational amplifier which is merely an inverter. The selected synthesized steering command is presented to the top operational amplifier which is the comparator; this compares the actual steering wheel position with the commanded position. The output of this comparator operational amplifier is similar to those already described. That is, if the steering wheel position and the synthesized steering command are within +1 volt of each other, but of opposite sign, the comparator output is zero and the steering panel light remains unlit. If the comparator output is greater than +1 volt in either direction, the appropriate steering command will be indicated on the panel.

The upper left of FIG. 15 represents the implementation for indicating the gear shift position in one of four positions by an appropriate voltage in two volt increments according to the gear shift switch position, high, low, reverse or parking gear. A snap-acting switch, or shunt feed, is desirable here.

Channels 19 and 20 are utilized to provide a two bit synthesis of the gear commanded with an operational amplifier summer. The absence of channel 19 and 20 tones is indicative of PARK. If a channel 20 tone only is present, this indicates REVERSE. If channel 19 only is present, this indicates LO or second gear. If tones for both the channels 19 and 20 are present, this indicates HIGH gear. Neutral and a third gear position are not implemented.

The gear shift position and the negative gear shift command are compared in the comparator operational amplifier. The circuit operates as the previous ones. If the output of the comparator operational amplifier is positive, the driver has to shift upward in his gear shift sequence. If the output is negative, the person shifts down in the sequence HIGH, LOW, REVERSE and PARK. If the two signals are within + or −1 volt of each other, the comparator output is a logical zero and the panel light would be dark. Otherwise the appropriate command, UP or DOWN, is displayed on the shift panel light.

PHONEMIC ANALYSIS OF THE SPOKEN DIGITS "0" & "1"

An idiosyncratic phonemic analysis was done (see col. 6). The two spoken digits "0" & "1" were spoken a number of times and with minor variations by the writer. The word "zero" alternatively can be pronounced "Zee'-row" or "Zēr 'oh," and the word "one" can be pronounced "Wun" or "Ooh-Wuhn'." The vowel sounds and consonants sounds were considered separately by their relative frequencies. The vowel sounds considered were z, e, o, ooh, uh, ranked in this order to frequency from low to high, indicated by $V1$ through $V5$ respectively. The consonant sounds similarly were ordered on the basis with respect to relative frequency as follows: w (swept upward), r, n (slight upward sweep), z, from lowest to highest and indicated by $C1$ through $C4$ respectively. The time duration of the consonant and vowel sounds was judged to be relatively constant.

For further reference, see Geldard (1953).[1] In particular certain consonant sounds have two or more frequency bands. As a result, the above first approximation may have to be modified.

The spoken words, "zero" and "one" then were characterized by the sequence of vowel and consonant sounds with V for vowel and C for consonant with the number indicating the relative frequency. Set theory notation was used with the inverted U indicating intersection or conjunctive operator and the U symbol indicating union or the alternative operator. A dash indicates that no syllable is present and a slash or fraction bar indicates the pause between syllables. Thus the spoken digit "zero" can be characterized as $(V1 \cap C4)V2(-UC2)/(C2U-)V3-$. The spoken digit "one" can be characterized as $(-UV5)C1V4C3/-$. These two set theory notations for the spoken digits can also be considered to be their fre- ---
[1] Geldard, F. A. The Human Senses. New York: Wiley, 1953, X, 365 pp., p. 100.

quency-time signatures. It is these frequency and time signatures that are used in the subsequent electronic implementation of circuits to differentiate between these two digits.

SIGNATURE ANALYSIS OF "ZERO" AND "ONE"

In FIG. 18 are repeated the frequency and time signatures in set theory notations for the two spoken digits.

The overall block diagram and operation are as follows: First the spoken speech is detected by amicrophone, amplified, then held at constant level by an Automatic Gain Control (AGC) circuit. The constant volume level speech signals then are fed to detectors for the envelope, initial consonant and initial vowel. The first detects the start and stop of speaking so that the number of syllables can be counted in addition to determining when a word starts for the purpose of enabling the other circuitry. The remaining circuitry detects whether a high or low frequency vowel is spoken and whether a high or low frequency consonant is spoken.

The top line of the diagram is used to produce a set or start pulse whenever a spoken word is detected. This set pulse is used to enable the remainder of the circuitry such that it operates only when a spoken word is detected. At the end of each spoken word, roughly 0.7 second, the reset pulse is started which shuts off the logic circuitry and resets it. The syllable counter detects the pause between syllables, and determines whether one syllable (coded "0") or two syllables (coded "1") are spoken.

The vowel counter works as follows. A vowel band-pass filter is used to skip the vowel sound V1 and V5 (the low frequency "z" or the high frequency "ooh"). The envelope detector then is used to determine whether any of the remaining three vowels V2 through V4 had been spoken. If they had been spoken, the flip-flop signals this by presenting a logical "one" at the output. This enables the number of vowels of intermediate frequency to be counted, which is used in determining which initial vowel was spoken and what the initial consonant was.

Determination of initial consonants is done as follows. A high pass filter circuit permits the high frequency consonant C4 or "z" to go through. When this sound is detected in its envelope detector, it sets a flip-flop to "one." A low frequency consonant filter detects the low frequency consonant sound of "w." The corresponding envelope detector sets a flip-flop correspondingly. The outputs of the consonant high and low pass detectors go to AND gates which are enabled by the vowel detector complement.

The initial consonants have been detected in the high pass circuitry to be either a high frequency consonant "z" (C4), or not at all. Or the low frequency circuitry has detected the consonant "w" (C1) or not. These consonant detectors have their outputs stretched so that when the vowel counter output appears for the first vowel consonant the outputs of the consonant detectors are summed with the output of the vowel counter for the first vowel only. This results in the detection of the initial consonants and the corresponding outputs are present either as an initial consonant present (1) or not (0)

A similar system exists for the detection of the initial vowel in the spoken digit. Two filter circuits are used. A high pass vowel detection circiut is utilized to detect whether the initial vowel is high frequency, V4 of "uh" or whether it is low frequency V2 or "e." The vowel counter output for the first vowel sound is used for gating to evaluate only the first vowel.

SIGNATURE RECOGNITION LOGIC

The two wave forms in FIG. 21 show the approximate duration of the set pulse and that of the first vowel pulse; these time or enable the remaining circuitry. The set pulse starts whenever energy is detected by the envelope detector for any spoken word. The duration is about 0.7 of a second but is adjustable. Whenever the set pulses disappears, the reset pulse is present and is used to reset the circuitry. The first vowel pulse appears whenever the relatively constant energy of a vowel is detected and is approximately 0.1 second or sooner after the set pulse has appeared at the start of a spoken digit. This first vowel duration is estimated to last 0.1 to 0.3 second and its pulse duration is adjustable. The first vowel pulse thus indicats the presence and duration of the first vowel in the spoken digits "zero" or "one." The first vowel pulse obviously is zero when the second vowel is "0" appears.

FIG. 19 shows the majority logic decision-making in the digit recognition. The first operational amplifier performs the implementation of recognizing a spoken "0." The three characteristics going into the recognition are that the syllable counter had to have counted two syllables, that the initial consonant be high frequnecy ("z") and that the initial vowel be a low frequency one ("e"). A level adjustment is used to insure that if three out of these three characteristics or two out of the three characteristics agree, that they will outweigh the negative 10 volt input and produce a negative output indicative of "zero." If only one of the three characteristics deemed necessary for a spoken "zero" is present, the $-10$ volts over-rides this single characteristic and the output of the operational amplifier is positive, signifying not "zero." The operational amplifier output is examined only when a delayed set pulse is present. The delay is to let the Syllable Counter operate fully. Thus the memory flip-flop can be set only when a delayed set pulse is present or immediately after a word has been spoken into the microphone. The output is a logical zero whenever something other than "zero" has been spoken and is a logical one whenever "zero" has been spoken. This somewhat confusing and arbitrary decision preserves a positive logic of "1" meaning a given signal exists. A similar situation arises with a spoken "one."

The bottom pare of the circuitry illustrates the implementation of recognizing a spoken "one." The three characteristics of importance here are that the syllable counter had to have counted just one syllable, an initial low frequency consonant sound ("w"), and an initial high frequency vowel sound ("uh"). A majority logic scheme is used, if two out of these three, or if three out of these three characteristics are present, the digit is recognized as "one." The logic voltage levels are such that two out of three or three out of the three inputs over-ride the level adjust input and the output correspondingly will be negative. If merely any one out of these three characteristics is present, its input will be insufficient to over-ride the $-10$ volts coming from the level adjust. Then the sum of the input voltages will be negative resulting in a positive output indicating "not one" was present.

A recognition error occurs in the case if both the "0" and "1" outputs are zero. This can occur if the person said something else than a "0" or "1" or if the recognition circuitry had been set incorrectly. An error recognition light on the panel would be lit and the driver would have to repeat his digit into the microphone while the technician made adjustments to the recognition circuitry.

ADAPTIVE STRESSOR

The free-running oscillator (FIG. 16) is used as the pseudo-random number generator. It has outputs of logical zero or one, corresponding to zero volts or $+10$ volts. Since the maximum rate of speaking the digit "zero" or "one" is two per second, it is assumed that the output of the free-running oscillator would indeed be sampled at random time intervals. The purpose of the sample-and-hold switch is to examine the output of the free-running oscillator and then to retain this information for the duration of one spoken digit. The sampling is done within 0.1 millisecond and the oscillator state of $+10$ volts or zero volts is determined and then held for the duration of a spoken digit. A bias in the ration of spoken "zeros"

and "ones" can be introduced by adjusting the ON time of the free-running oscillator, if the ON time of the oscillator is greater than 50%, then more "ones" will be commanded.

The command word, the stretched output of the free-running oscillator, is used to select a spoken "zero" or "one" off the endless two track tape loop via selecting either the bottom track ("0") or the top track ("1"). The word selector is turned on by the gating switch and continues sampling one tape track until the start and stop of a spoken digit is detected.

The word start-stop detector is necessary to insure that a spoken digit is picked off the tape. The word selector is started by an output of the sampling switch and is stopped whenever the spoken digit from the tape stops. The output or the word start-stop detector passes a spoken digit, a "zero" or "one," to the headphone for the student driver to listen to.

The command-spoken word comparator does just that. The student driver has to repeat into the microphone whether he thought he heard a spoken "zero" or a spoken "one." The digit recognition circuitry, has as an output a "one" or "zero" appropriately. The comparator circuit compares the command word with the spoken word recognized. If the spoken and recognized words agree, this is counted as a hit and a correct pulse results. If the outputs disagree, the correct pulse is missing and an error is recorded in the counter and on the two recorders.

The command-recognized word comparator adjusts the spoken digit rate to the student driver. To allow for the student drivers' having to pay attention to driving and ignoring the spoken words, the word stop detector energizes a wait multivibrator for a maximum delay of five seconds which is about the maximum permissible in recognizing a digit. If the student ignores the digit for more than 5 seconds, the rate of presenting further digits is slowed down. The outputs of the wait multivibrator and the commanded-word recognized-word comparator are summed in an AND gate. If a correct pulse occurs within five seconds after speaking a digit, a pulse is sent to the unijunction multivibrator whose frequency is controlled by voltage. The frequency of the voltage-controlled oscillator increases for each correct pulse and drifts downward each time an error is made. The lower limit is 0.2 pulse per second and the high limit is 2.0 pulses per second corresponding to two spoken digits per second.

Thus it is seen that the device accomplishes all of its stated objectives.

Some changes may be made in the construction and arrangement of my driver training and testing equipment without departing from the real spirit and purpose of my invention, and it is my intention to cover by my claims, any modified forms of structure or use of mechanical equivalents which may be reasonably included within their scope.

I claim:

1. A driver simulator, comprising,
a visual projector means for portraying a series of driving situations projected on a screen in view of a driver station on a driver trainer unit,
an adaptive stressor unit having an audio unit which provides auditory loading sound patterns to the student driver, and an auditory recognition means to receive and record audible responses from the student in response to said sound patterns.

2. The structure of claim 1 wherein said sound patterns comprise random audible expressions.

3. The structure of claim 2 wherein said audible expressions include substantially the audible expressions one and zero.

4. The structure of claim 1 wherein said random audible expressions are selected from a group of predetermined expressions.

5. The structure of claim 4 wherein said group of predetermined expressions are only the expressions one and zero.

6. The structure of claim 1 wherein said auditory recognition means includes an indicator for indicating correct and incorrect audible responses from the student as compared with the audible responses from the audio unit of the stressor unit.

7. The structure of claim 3 wherein said recognition means indicator is coupled to said stressor unit to control the rate of loading on the student.

8. The structure of claim 7 wherein said rate of loading is controlled by the loading being reduced in response to errors being indicated by the indicator and the rate being increased in response to the absence of errors on the indicator.

9. The structure of claim 8 wherein said loading is variable between predetermined limits.

10. The structure of claim 9 wherein a feedback device is included in said trainer to provide an instantaneous indication to the student of the correctness of his response to driving scenes from said visual projector means.

11. The structure of claim 1 wherein said trainer includes a plurality of driving controls, each of said driving controls being electrically connected to a comparator logic unit and adapted to register a predetermined value thereon varying with the action taken on each control, said visual projector means including film having predetermined magnetic signals recorded thereon in association with successive driving situations pictured thereon, said film being electrically connected to said comparator logic unit to receive said magnetic signals, said comparator logic unit being capable of comparing said signals from said film with said signals from said driving controls.

12. The structure of claim 11 wherein a visual display panel is connected to said comparator logic unit to register the results of the comparisons being made between said film signals and said driving controls by said comparator logic unit.

13. The structure of claim 12 wherein a magnetic tape unit is connected to said comparator logic unit to record the results of the comparisons being made between said visual projector means signals and said driving controls by said comparator logic unit.

References Cited

UNITED STATES PATENTS

| | | | |
|---|---|---|---|
| 2,870,548 | 1/1959 | Chedister | 35—11 |
| 3,015,169 | 1/1962 | Chedister et al. | 35—11 |
| 3,108,384 | 10/1963 | Jazbutis et al. | 35—11 |
| 3,186,110 | 6/1965 | Smyth | 35—11 |
| 3,251,142 | 5/1966 | Jazbutis | 35—11 |
| 3,266,173 | 8/1966 | Sheridan | 35—11 |
| 3,266,174 | 8/1966 | Bechtol et al. | 35—11 |

EUGENE R. CAPOZIO, Primary Examiner

W. H. GRIEB, Assistant Examiner

U.S. Cl. X.R.

35—22